(12) United States Patent
Tautz

(10) Patent No.: US 6,235,178 B1
(45) Date of Patent: May 22, 2001

(54) METHOD AND DEVICE FOR COATING A METAL STRIP

(75) Inventor: Wilfried Tautz, Forchheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/380,147

(22) PCT Filed: Feb. 17, 1998

(86) PCT No.: PCT/DE98/00463

§ 371 Date: Aug. 25, 1999

§ 102(e) Date: Aug. 25, 1999

(87) PCT Pub. No.: WO98/38354

PCT Pub. Date: Sep. 3, 1998

(30) Foreign Application Priority Data

Feb. 27, 1997 (DE) ............................................. 197 07 980

(51) Int. Cl.⁷ ............................. C25D 21/12; C25D 7/06; C25D 17/00; B23H 3/02; B23H 7/04
(52) U.S. Cl. ........................... 205/84; 205/138; 205/141; 204/211; 204/228.1; 204/228.7; 204/229.2; 204/FOR 922
(58) Field of Search ........................... 205/84, 138, 141; 204/211, 228.1, 228.7, 229.2, FOR 922

(56) References Cited

FOREIGN PATENT DOCUMENTS

| 50-10256 | * 4/1975 | (JP). |
| 54-101842 | 8/1979 | (JP). |
| 5-226541 | 9/1993 | (JP). |
| 7-173700 | 7/1995 | (JP). |
| 1 437 417 | 11/1988 | (RU). |

* cited by examiner

*Primary Examiner*—Edna Wong
(74) *Attorney, Agent, or Firm*—Kenyon & Kenyon

(57) ABSTRACT

A method for coating a metal strip using a coating metal, in particular for coating a steel strip using zinc or a zinc/nickel compound, by means of at least one electroplating cell through which current flows and which contains an electrolyte through which the metal strip is passed, the current effecting the deposition of a layer of coating metal on the metal strip, and the current being controlled by a so-called monitor controller that has a process model and a controller part. The current is controlled in such a way that a layer of a desired thickness is deposited on the metal strip, the controller part being adjusted to the altered state of the coating plant in the event of changes in the state of the coating plant, in particular when a new metal strip enters or the coating falls below a minimum intended layer thickness.

17 Claims, 3 Drawing Sheets

METHOD AND DEVICE FOR COATING A METAL STRIP

This is a national stage application of PCT/DE98/00463 filed Feb. 17, 1998.

FIELD OF THE INVENTION

The invention present relates to a method and an apparatus for coating a metal strip using a coating metal, in particular for coating a steel strip using zinc or a zinc/nickel compound.

BACKGROUND INFORMATION

A conventional coating plant typically has one or more electroplating cells, in which there is an electrolyte which contains the metals for the coating of the metal strip. The metal strip is led through the electrolyte liquid. In addition, anodes are arranged in the electrolyte. The metal strip is coated by means of an electric current between the anodes and the metal strip, which acts as a cathode. In the process, the current is controlled in such a way that a layer of a desired thickness is deposited on the metal strip.

However, in the industrial coating of metal strips there are two conflicting requirements. On the one hand, a predefined coating (weight) setpoint should, as far as possible, not be exceeded, since too thick a coating consumes an unnecessarily large amount of material and leads to higher costs. However, in order to be able to guarantee the desired properties of the metal strip, it must be ensured that the coating (weight) does not fall below a specific lower limit at any point on the strip.

SUMMARY

An object of the present invention is to provide a method and an apparatus for coating a metal strip using coating metal which makes it possible to keep as accurately as possible to a predefined coating (weight) setpoint value. In this case, compliance with a specific coating (weight) lower limit in particular is to be guaranteed, without the metal strip being coated to an unnecessarily high degree.

According to the present invention, the object is achieved by a method and an apparatus in which the current through the electroplating cell is controlled as a function of the properties of the electroplating cell by a monitor controller that has a process model and a controller part, the current is controlled in such a way that a layer of a desired thickness is deposited on the metal strip, in which case, in the event of changes in the state of the coating plant, in particular when a new metal strip enters or the coating falls below a minimum intended layer thickness, time constants of the controller part are matched to the altered state of the coating plant. In this way, it is possible to suppress measurement noise, and large controller movements, which can be caused by the process model not being an exact image of the coating plant, are adequately smoothed, and at the same time it is possible to react rapidly to external events, such as a new strip entering the plant or the occurrence of critical states, such as the coating weight falling below a minimum value.

To this end, in a particularly advantageous way, the current is controlled using a dynamic low-pass filter as a function of the coating weight mean value, in particular as a function of the ratio of coating weight mean value and coating weight value ascertained by the process model, it being the case that when a new metal strip enters the coating plant, the time constant of the dynamic low-pass filter for controlling as a function of the coating weight mean value is reduced and subsequently enlarged. In the case of a simple low-pass filter, the time constant, once set, would be effective from the start. In contrast, the dynamic low-pass filter used according to the present invention operates in such a way that it initially includes direct access at each strip start. After this, a time constant is set which rises slowly to a specific value guaranteeing adequate smoothing. The result of this is that the monitor controller sets the predefined coating weight setpoint value at the strip start as rapidly as is at all possible, i.e., without any kind of smoothing. With an increase in the measured values, the dynamic low-pass filter then changes into a mode of operation which smooths large control movements, in particular those caused by measurement noise and differences between the process model and the real process.

In a further advantageous embodiment of the present invention, the current is controlled by means of a dynamic low-pass filter as a function of the coating weight minimum value, in particular as a function of the ratio of coating weight minimum value and coating weight value ascertained by the process model, it being the case that, when the coating weight falls below the minimum value, the time constant of the dynamic low-pass filter is reduced to a very small value, and above the coating weight minimum value, it is set to a large value ensuring adequate smoothing. In this case, it is particularly advantageous, when the coating weight exceeds the minimum value, initially to keep the output from the dynamic low-pass filter constant for a specific waiting time, and after this waiting time has expired to control the said output as a function of the coating weight minimum value, in particular as a function of the ratio of coating weight minimum value and coating weight ascertained by the process model, the time constant of the dynamic low-pass filter being set to a value ensuring adequate smoothing.

DETAILED DESCRIPTION

Figure 1:
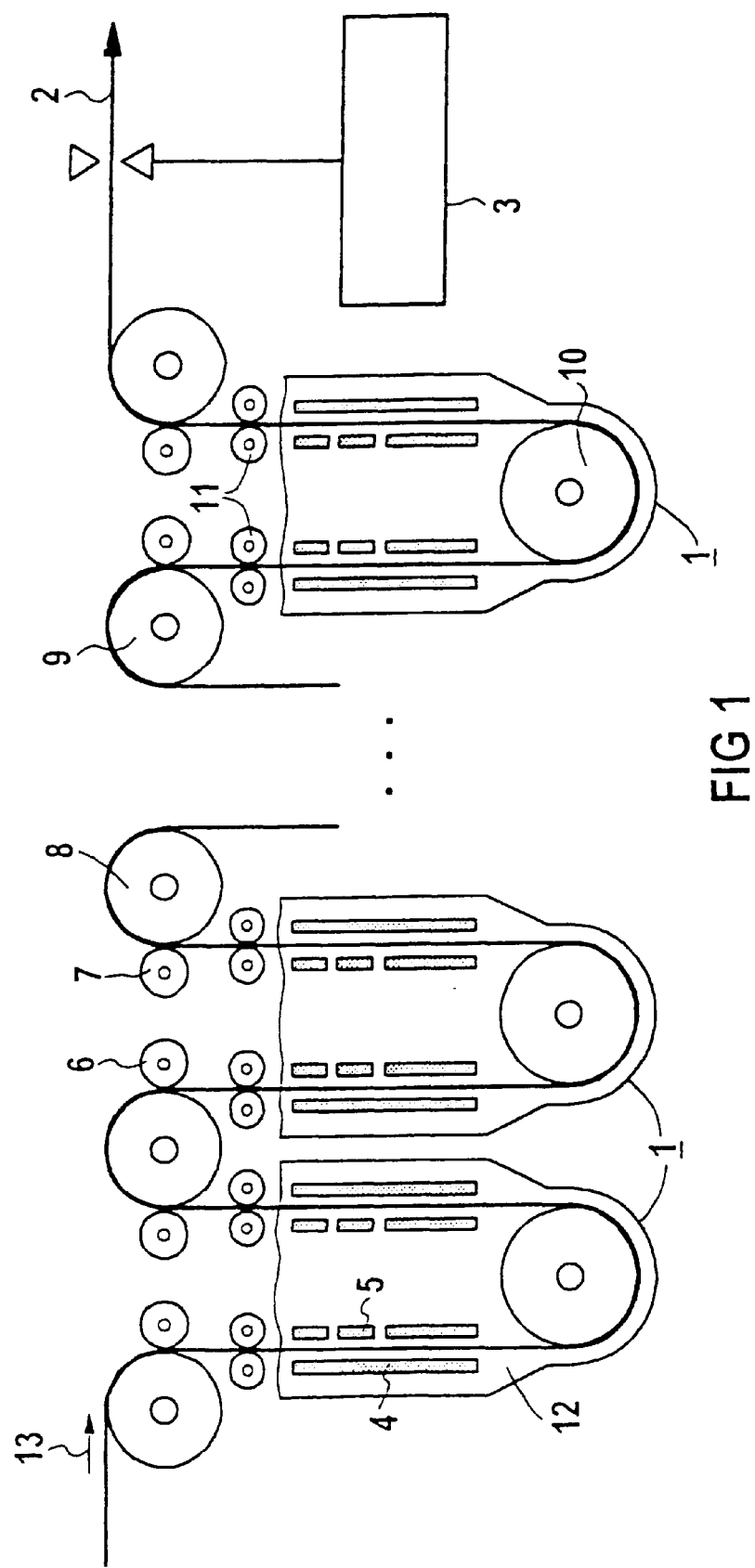
FIG. 1 shows a coating plant.

FIG. 1 shows the basic structure of a coating plant in which rolled steel strips 2 can be coated using zinc or zinc/nickel. In the coating plant there are several, for example 10, electroplating cells 1, in which there is an electrolyte 12 which contains the metals for the coating. Different electrolytes are used for the coating using zinc (Zn mode) and for the coating using zinc/nickel (ZnNi mode). An electrolyte control system (not shown) ensures that the composition and the para-meters of the respective electrolyte remain constant, so that good quality of the electroplating is always ensured.

Steel strip 2 which is to be coated is led through rollers 6, 7, 8, 9, 10 and runs through the individual electroplating cells 1 at a specific speed in the direction of the arrow designated by reference symbol 13. Fitted in each cell are 4 anodes 4, 5, 2 anodes 5 for the top side and 2 anodes 4 for the bottom side of strip 2. Current rollers 8, 9 above cells 1 transmit the negative pole to the strip, which in this way becomes the cathode. The coating of the strip is carried out electrolytically, in that a specific current is impressed into anodes 4, 5 with the aid of rectifiers. The effect of this current is that the zinc or zinc/nickel contained in the electrolyte is deposited on the strip surface.

The currents are set separately for the anodes of the top side and the bottom side of strip 2. As a result, the thicknesses of the coatings for the top side and the bottom side may be fixed separately. It is therefore possible not only to coat a strip 2 with equal thicknesses on both sides, but also to coat the top side and the bottom side with different thicknesses, independently of each other, by means of differently set currents.

There is also the possibility of coating only one side of the strip. In this case, the first electroplating cell is fed with a so-called flash current for the side which is not intended to be coated. A minimum coating is thus produced on this side, and is dimensioned such that it is just pickled off again in the remaining cells by the acid of the electrolyte. This prevents the acid of the electrolyte from dissolving iron out of the uncoated side of the strip.

In order for it to be possible to operate the coating plant continuously, the individual strips are welded to one another upstream of the plant. The welds produced in this way are tracked, so that it is known at any time in which part of the plant the old strip is still located and where the new strip is already to be encountered. Downstream of the plant, the strips are separated again. Each strip is either wound onto a coil or is further subdivided and wound onto several coils.

The coating plant is intended to apply a coating having a precisely fixed thickness in each case to the top side and the bottom side of the strip. These setpoints are to be complied with as precisely as possible. In particular, the thickness must not fall below a specific minimum at any point on the strip, since otherwise the required properties of the strip cannot be guaranteed. On the other hand, too great a thickness is not desired, since it consumes material unnecessarily and leads to higher costs.

A coating weight control system ensures compliance with these stipulations. Therefore, at a specific distance downstream of electroplating cells 1, there is a coating weight gauge 3, which measures the thicknesses of the coatings on the top side and the bottom side of strip 1. Based on these measured values, the coating weight control system influences the coating, by calculating for anodes 4, 5 of electroplating cells 1 the necessary currents, which are then fed as manipulated variables to the appropriate rectifiers.

The coating weight control system controls the coating of the top side and the bottom side of strip 1 separately. In addition, when there is a weld in the plant, the said system has to control the old strip and the new strip separately. Therefore, the coating weight control system is present a total of four times.

The coating weight control system has the task of setting the currents for anodes 4, 5 of electroplating cells 1 continuously in such a way that the desired coating weight of strip 1 is always reached, specifically irrespective of which operating conditions prevail at that time. The quantity of zinc or zinc/nickel, which is precipitated from the electrolyte and coats strip 1, is proportional to the product of current and time. The strip area coated per unit time is the product of strip width and strip speed. If it is therefore desired to calculate the coating weight measured in g/m², then the current, the strip width and the strip speed are taken into account.

The coating weight control system has the converse task, namely of calculating the current required for a predefined coating weight setpoint. This is performed using the following equation:

$$I_{total} = \frac{G^*_{mean} \cdot b_{strip} \cdot v_{strip} \cdot 60}{c_s \cdot \eta_{cells} \cdot k_{control}}$$

where

| | |
|---|---|
| $I_{total}$ | is the total current [A] |
| $G^*_{mean}$ | is the coating weight setpoint [g/m²] |
| $b_{strip}$ | is the strip width [m] |
| $v_{strip}$ | is the strip speed [m/min] |
| $c_s$ | is the deposition equivalent [g/Ah] |
| $\eta_{cells}$ | is the cell efficiency |
| $k_{control}$ | is the controller output. |

$I_{total}$ is the total current [A]

$G^*_{mean}$ is the coating weight setpoint [g/m²]

$b_{strip}$ is the strip width [m]

$V_{strip}$ is the strip speed [m/min]

$c_s$ is the deposition equivalent [g/Ah]

$\eta_{cells}$ is the cell efficiency $k_{control}$ is the controller output.

The significant influencing variables in the current calculation are thus the coating weight setpoint, the strip width and the strip speed. Factor 60 arises from the units used as a result of the conversion min/h. Deposition equivalent $c_s$, is 1.2193 g/Ah for zinc. Since the acid of the electrolyte in the electroplating cells dissolves part of the coating from the strip again, the actual coating weight is somewhat lower than that calculated theoretically. This effect is taken into account by cell efficiency $\eta_{cells}$.

Figure 2:
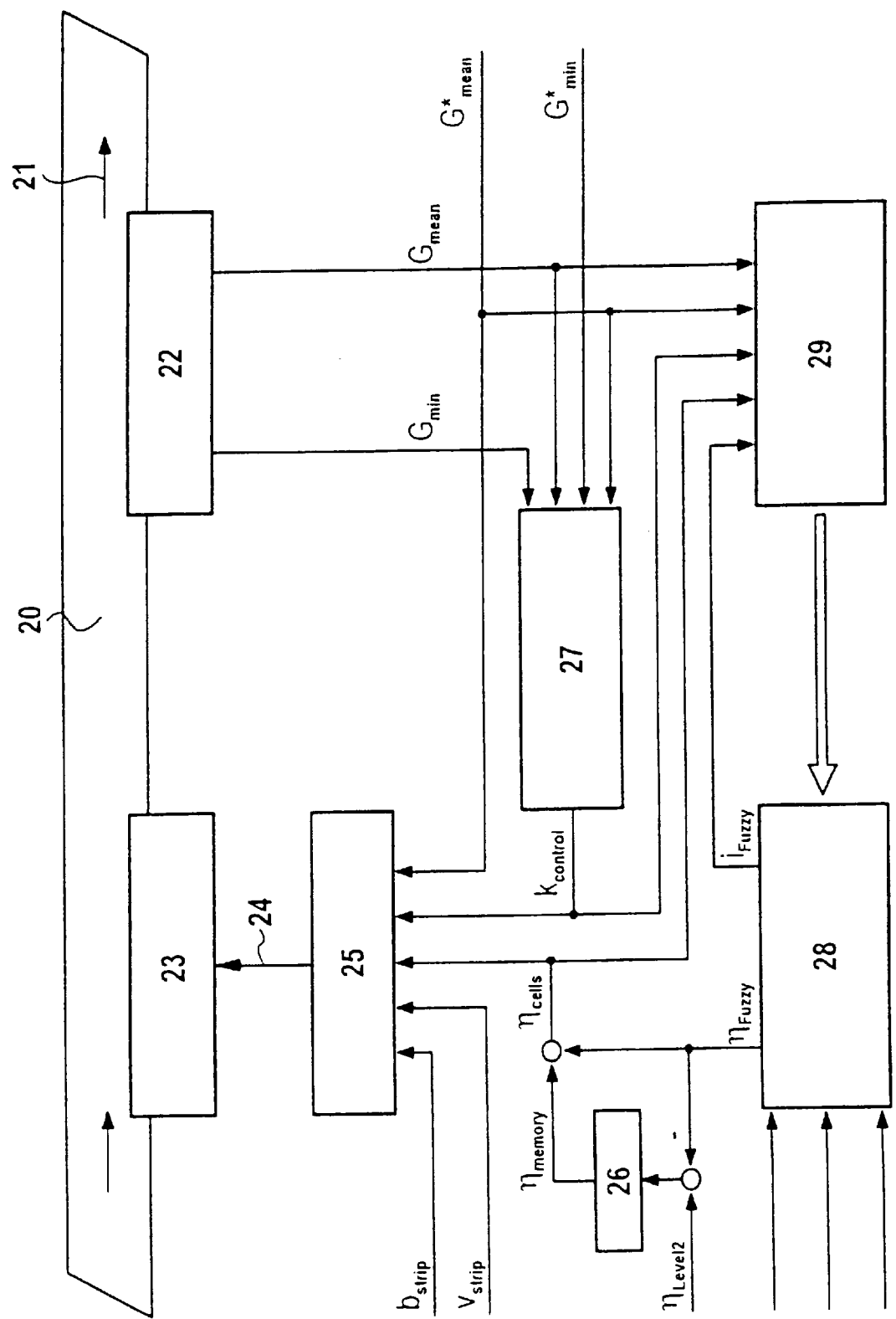
FIG. 2 shows a coating weight control system having a monitor control system according to the present invention.

The coating weight control system determines this cell efficiency $\eta_{cells}$ and adapts it to the prevailing operating conditions with the aid of variable $k_{control}$. In this case, $k_{control}$ acts as a controller output to set the current and hence the coating weight in such a way that the predefined coating weight setpoint is reached. FIG. 2 shows how this takes place in principle.

Current calculation 25, which is supplied with variables $G^*_{mean}$, $b_{strip}$, $V_{strip}$, $\eta_{cells}$ cells and $k_{control}$, sets the coating weight at the entry to the coating plant via the current. At the exit, a coating weight gauge 22 registers the actual coating weight and makes the measured values $G_{min}$ and $G_{mean}$ available, $G_{min}$ being the coating weight minimum value and $G_{mean}$ coating weight mean value.

The following setpoints are associated with these measured values:

| | |
|---|---|
| $G^*_{min}$ | coating weight lower limit |
| $G^*_{mean}$ | coating weight setpoint |

Based on these measured values and setpoints, the coating weight control system controls the coating weight and, for this purpose, calculates controller output $k_{control}$.

When setting up the control concept of the coating weight control system, it is expedient to effect a subdivision into the following 3 components:

| monitor controller | 27 |
| --- | --- |
| fuzzy system | 28 |
| on-line training | 29 of the fuzzy system |

The monitor controller controls the coating weight.

To this end, it evaluates measured values $G_{min}$ and $G_{mean}$ and setpoints $G^*_{min}$ and $G^*_{mean}$ and, from these, calculates controller output $k_{control}$. This is effected in such a way that the conditions $$G_{min} \geq G^*_{min} \text{ and } G_{mean} = G^*_{mean}$$

are complied with as well. The first condition states that the coating weight must not fall below the lower limit. The second condition expresses the fact that the predefined coating weight setpoint is to be complied with.

Cell efficiency $\eta_{cells}$ depends on the respective operating conditions of the plant. The variables that are taken into account for its calculation are in this case:

current density of the anodes pH of the electrolyte temperature of the electrolyte These 3 variables are used as input variables of a fuzzy system 28, which provides cell efficiency $\eta_{Fuzzy}$ at its first output. The super ordinate automation level, which is not illustrated in FIG. 2, also calculates for each strip a cell efficiency which is designated by $\eta_{Level2}$. At each strip start, the difference between these two cell efficiencies $$\eta_{memory} = \eta_{Level2} - \eta_{Fuzzy}$$

is stored and subsequently, during the coating of the strip, added to the cell efficiency of the fuzzy system:

$$\eta_{cells} = \eta_{memory} + \eta_{Fuzzy}$$

The result of this is that each strip starts with cell efficiency $\eta_{cells} = \eta_{Level2}$ predefined by the super ordinate automation system, and thereafter fuzzy system 28 can change this cell efficiency $\eta_{cells}$.

At the beginning, fuzzy system 28 is profiled using simple, verbally formulated expert knowledge.

During the operation of the plant, on-line training 29 ensures automatic adaptation of fuzzy system 28 to the actual plant behaviour. To this end, in the present example, the prevailing situation is fed to on-line training 29 in the form of variable $i_{Fuzzy}$ of fuzzy system 28. In addition, the prevailing cell efficiency used in the current calculation is taken into account. This efficiency is identified by variables $\eta_{cells}$ and $k_{control}$, which are also fed to on-line training 29. In order for it to be possible to assess the coating behaviour of the plant, coating weight setpoint $G^*_{mean}$ and measured coating weight $G_{mean}$ are also fed to the on-line training.

The actual cell efficiency of the plant is calculated from all these variables. This efficiency is used in order to adapt the fuzzy system step by step, so that it represents the actual plant behaviour better and better. As a result, the fuzzy system is always able to determine the optimum cell efficiency.

Figure 3:
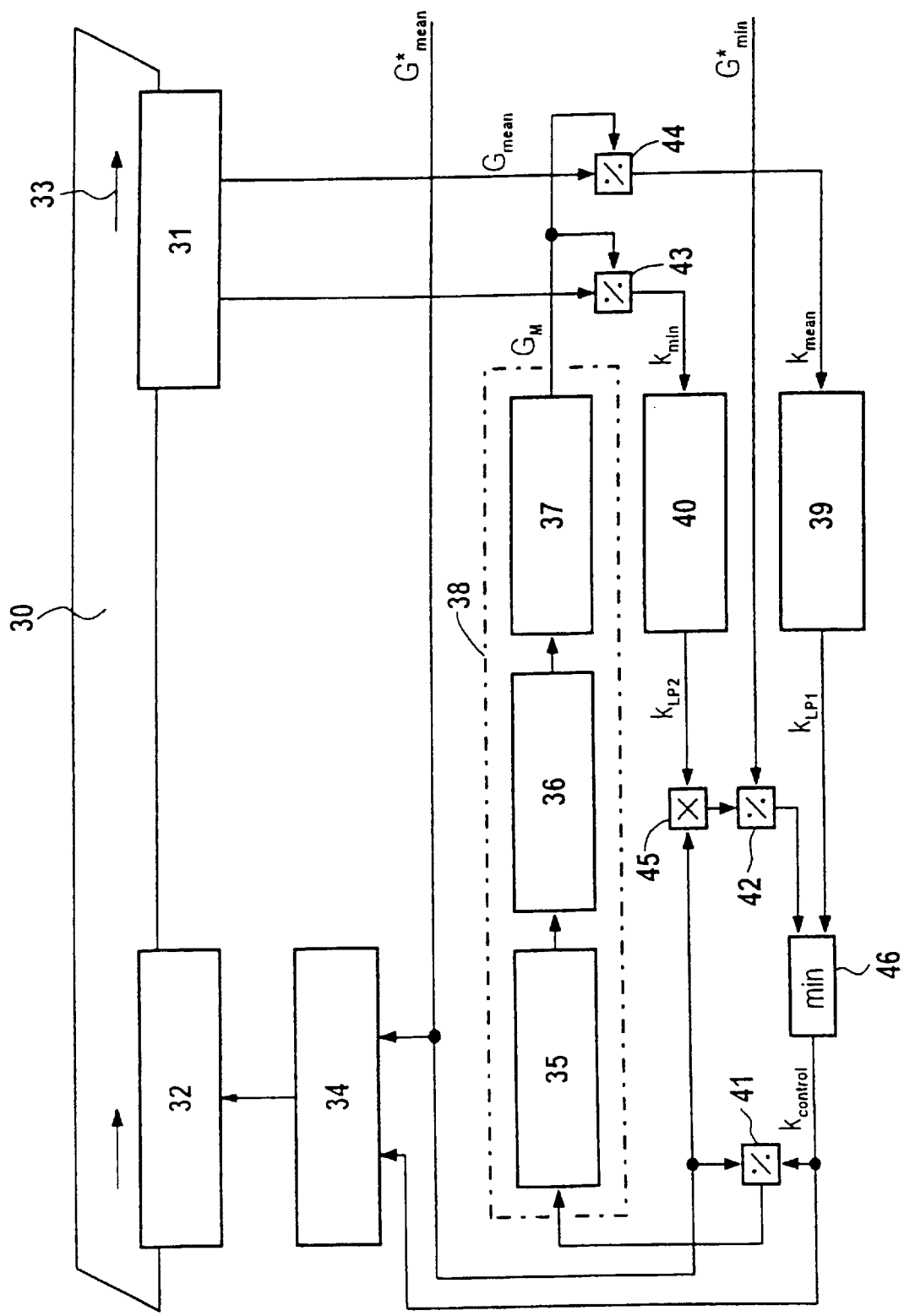
FIG. 3 shows the structure of a monitor controller according to the present invention.

The present coating process extends from the electroplating cells as far as coating weight gauge (measuring device) 22. Strip 20 running through is coated in the electroplating cells. Monitor controller 27 influences the coating by means of controller outputs which are converted in the current calculation. However, the effects of these controller outputs are only registered when the relevant strip section has been transported as far as the gauge. Depending on the arrangement of the gauge, and depending on the strip speed, the result may be relatively long transport times. Monitor controller 27 used is designed in such a way that it has good control dynamics, even given long transport times. Its structure is shown by FIG. 3.

Strip 30 runs through the coating plant in the direction of arrow 33. Coating weight gauge 31 registers the actual coating weight and provides measured values $G_{min}$ and $G_{mean}$.

The monitor controller fixes controller outputs $k_{control}$ which are used in the current calculation. A plant model 38 operates in parallel with the coating plant. This model is supplied, at its input, with the quotient $$\frac{G^*_{mean}}{k_{control}}$$

This quotient is also contained in the current calculation It is a measure of the coating weight applied at any one time.

The plant model simulates the behaviour of the coating plant. It continuously calculates the coating weight of the strip applied in the electroplating cells and tracks this as far as the coating weight gauge. Coating weight $G_M$ is then output at the exit of the plant model.

By means of plant model 38, two coating weights $G_{mean}$ and $G_M$ are synchronized, so that they can be placed in a relationship with each other. If the cell efficiency used in the current calculation is correct, it is then true that $G_{mean} = G_M$. Otherwise, the cell efficiency is corrected using $$k_{mean} = \frac{G_{mean}}{G_M}$$

This value $k_{mean}$ could in principle be output directly as manipulated variable $k_{control}$. However, it is particularly advantageous to perform smoothing, which is done by dynamic low-pass filter 39. Output variable $k_{Lp1}$ from the latter is the manipulated variable which is needed in order to control coating weight mean value $G_{mean}$, in order to achieve $G_{mean} = G^*_{mean}$.

A further measured value, namely coating weight minimum value $G_{min}$, comes from the coating weight gauge. The procedure with regard to this measured value is exactly the same as that with regard to coating weight mean value $G_{mean}$. Hence, the value $$k_{min} = \frac{G_{min}}{G_M}$$

is calculated and smoothed in a particularly advantageous way using dynamic low-pass filter 40. Output variable $k_{LP2}$ from the latter is further multiplied by $G^*_{mean}$ and divided by $G^*_{min}$, in order that measured value $G_{min}$ is compared not with setpoint $G^*_{mean}$, which is contained in $G_M$, but with $G^*_{min}$:

$$k_{LP2} \cdot \frac{G^*_{mean}}{G^*_{min}}$$

This value is the manipulated variable which is needed-in order to control coating weight minimum value $G_{min}$, in order to achieve $G_{min} = G^*_{min}$.

The minimum of this manipulated variable and of the abovementioned manipulated variable $k_{LP1}$ is manipulated variable $k_{control}$, which is output by the monitor controller:

$$k_{control} = \min\left(k_{LP1}, k_{LP2} \cdot \frac{G^*_{mean}}{G^*_{min}}\right)$$

The monitor controller thus controls both coating weight mean value $G_{mean}$ and coating weight minimum value $G_{min}$. It thus contains two controllers. Of the two manipulated variables, the smaller is output, since this leads to a higher coating weight. This achieves the situation where, in normal circumstances, the monitor controller controls the coating weight mean value, in order to achieve $G_{mean}=G^*_{mean}$. However, if in this case the coating weight minimum value lies below the coating weight lower limit, then the monitor controller controls the coating weight minimum value, in order to achieve $G_{min}=G^*_{min}$. In this case, however, $G_{mean}>G^*_{mean}$.

Plant model 38 simulates the behaviour of the coating plant. It consists of the following three partial models:

| | |
|---|---|
| coating model | 35 |
| transport model | 36 |
| averaging | 37 |

The coating model calculates the coating weight of the strip that is applied in the electroplating cells.

The transport model tracks the coating weight of the strip from the electroplating cells as far as the coating weight gauge.

As already explained, the monitor controller contains two controllers, one for coating weight mean value $G_{mean}$ and a second for coating weight minimum value $G_{min}$. The dynamics of the first controller are set by dynamic low-pass filter 39, and the dynamics of the second controller are set by dynamic low-pass filter 40. These two dynamic low-pass filters fulfil the following functions:

Errors and noise in the measured values are smoothed.

In general, the behaviour of the plant model does not agree exactly with the behaviour of the coating plant. In particular, slight inaccuracies in the transport time may result. When the coating weight then changes, variables $G_{mean}$ and $G_{min}$, on the one hand, and variable $G_M$, on the other hand, do not change synchronously. As a result, pulses occur in variables $k_{mean}$ and $k_{min}$. These pulses are smoothed by the low-pass filters and hence reduced in size.

Changes in manipulated variable $k_{control}$ are made after smoothing.

Dynamic low-pass filter 39 has its parameters set by smoothing constant $n_{LP1}$. This smoothing constant corresponds to a time constant. It specifies the number of measured values over which the smoothing extends. If, for example, the coating weight gauge supplies new measured values after 1 min in each case and $n_{LP1}=3$ then the low-pass filter operates with a time constant of 3 min.

In the case of a simple low-pass filter, smoothing constant $n_{LP1}$ set as a parameter would be effective at any time from the start. Accordingly, dynamic low-pass filter 39 used according to the present invention operates in such a way that it initially permits direct access at each strip start. After this, use is made of a smoothing constant which rises slowly from 1 to $n_{LP1}$. This rise is implemented by means of a further low-pass filter using smoothing constant $n_{LP1}$.

This means that at each strip start, as soon as the first measured values have arrived, $k_{LP1}=k_{mean}$ because of the direct access. The result of this is that the monitor controller sets the predefined coating weight setpoint at the strip start as rapidly as at all possible that is to say without any smoothing. After this, the smoothing effect of the low-pass filter increases slowly.

Dynamic low-pass filter 40 has its parameters set by the following values:

$n_{LP2\ down}$ smoothing constant downwards $n_{LP2\ up}$ smoothing constant upwards $n_{LP2\ wait}$ wait constant, following a downward movement, until an upward movement is possible again.

The smoothing constant downwards $n_{LP2\ down}$ is used when output variable $k_{LP2}$ of the low-pass filter becomes smaller. This is the case, for example, when coating weight minimum value $G_{min}$ suddenly falls below coating weight lower limit $G^*_{min}$. In order that in this case $k_{LP2}$ and hence $k_{control}$ can be reduced rapidly, as a result of which the coating weight increases, the smoothing constant downwards $n_{LP2\ down}$ should be selected to be relatively small.

The smoothing constant upwards $n_{LP2\ up}$ is used when output variable $k_{LP2}$ of the low-pass filter becomes larger. This smoothing constant can have its parameters set such that adequate smoothing is achieved.

In order that the coating weight is not reduced immediately again in the event of an increase in measured value $G_{min}$, wait constant $n_{LP2\ wait}$ ensures that this only takes place after a further $n_{LP2\ wait}$ measured values have arrived.

A significant property of the monitor controller is that it operates without a persistent control deviation, which may be demonstrated by the following consideration. it is initially assumed that $$k_{control}=k_1$$

The plant model then outputs the value $$G_M = \frac{G^*_{mean}}{k_1}$$

If the coating weight $$G_{mean}=k_2 \cdot G^*_{mean}$$

is now measured in the plant, then the value $$k_{mean} = \frac{G_{mean}}{G_M} = k_1 \cdot k_2$$

is calculated in the monitor controller and, following the transient response of dynamic low-pass filter 39, is output as manipulated variable $$k_{control}=k_1 \cdot k_2$$

$k_{control}$ is therefore multiplied by factor $k_2$ as compared with the original value. As a result, both the coating weight in the electroplating cells of the plant and the input variable of the plant model decrease by factor $k_2$. Following the transport of the strip through the plant, the coating weight gauge registers this decrease and makes the measured value $$G_{mean}=G^*_{mean}$$

available. At the same time, the plant model also outputs the reduced value $$G_M = \frac{G^*_{mean}}{k_1 \cdot k_2}$$

Hence, the value $$k_{mean} = \frac{G_{mean}}{G_M} = k_1 \cdot k_2$$

is also calculated and output as manipulated variable $$k_{control} = k_1 \cdot k_2$$

The monitor controller therefore controls out deviations from the setpoint without a persistent control deviation. It thus has an integrating behaviour. In this case, the monitor controller uses the plant model to a certain extent as a memory for the previous controller outputs, in order to calculate new controller outputs based on these.

Furthermore, the monitor controller presented according to the present invention is characterized by the following properties and advantages with respect to conventional controllers:

At the strip start, deviations from the setpoint are controlled out as rapidly as at all possible, that is to say without any smoothing. After this, the smoothing effect of the dynamic low-pass filters sets in slowly.

If a simple I controller were to be used as monitor controller, then, because of the transport time in the coating plant, this could be set only to be very slow. The greater the transport time, the slower an I controller would have to be set. This disadvantage is avoided by the monitor controller presented here. Its dynamics can be fixed as desired, irrespective of the transport time, that is to say, for example, in accordance with technological aspects.

The result of the plant model contained in the monitor controller is that calculated values $k_{mean}$ and $k_{min}$ do not depend on output manipulated variable $k_{control}$, since $k_{control}$ influences measured values $G_{mean}$ and $G_{min}$ and variable $G_M$ in the same way, and these influences compensate one another. The stability of the monitor control system is thus ensured. This is true irrespective of how the dynamics of the monitor controller are set using dynamic low-pass filters 39 and 40.

Changes in setpoint $G^*_{mean}$ are directly implemented without a time delay, since they enter directly into the current calculation. In parallel with this, they are also present at the input of the plant model. This means that they influence values $G_{mean}$, $G_{min}$ and $G_M$ to the same extent, so that values $k_{mean}$ and $k_{min}$ are not influenced here either. This means that, in the case of setpoint changes, no transient-response processes occur. This is also true if coating weight lower limit $G^*_{min}$ is changed.

What is claimed is:

1. A method for coating a metal strip with a coating metal using a coating plant, comprising the steps of:

passing the metal strip through an electrolyte in an electroplating cell, a current flowing through the electroplating cell, the current effecting a deposition of a layer of the coating metal on the metal strip;

controlling the current using a monitor controller so that the layer of the coating metal deposited on the metal strip is a predetermined thickness, the monitor controller including a process model and a controller part;

controlling the current as a function of a coating weight mean value using a dynamic low-pass filters;

determining if a state of the coating plant is altered, the state of the coating plant being altered when a new metal strip enters the coating plant or when the layer of the coating metal deposited on the metal strip is less than a predetermined minimum thickness; and adjusting a time constant of the controller part to the altered state when the state of the coating plant is determined altered.

2. The method according to claim 1, wherein the controlling step includes the step of:

controlling the current using the dynamic low-pass filter as a function of a ratio of the coating weight mean value and coating weight value ascertained by the process model.

3. The method according to claim 1, wherein the adjusting step includes the steps of:

reducing the time constant and subsequently increasing the time constant when the new metal strip enters the coating plant, the time constant being associated with the dynamic low-pass filter.

4. The method according to claim 3, wherein the adjusting step includes the steps of:

setting the time constant to zero and subsequently continuously increasing the time constant when the new metal strip enters the coating plant.

5. The method according to claim 4, wherein the adjusting step includes the steps of:

setting a smoothing constant to one and subsequently enlarging the smoothing constant in accordance with the following relationship when the new metal strip enters the coating plant:

$$n_{LP1} = n_{LP1} + \frac{n_{LP1,\max} - n_{LP1}}{n_{LP1,\max}}$$

with $$n_{LP1,\max} = C_K \cdot \frac{L_{strip}}{V_{strip} \cdot \Delta t_M},$$

wherein $C_K$ is a constant, $L_{strip}$ is a length of the metal strip from entry into the electroplating cell to a coating weight gauge, $V_{strip}$ is a speed of the metal strip and $\Delta t_m$ is a time interval at which the coating weight gauge supplies measured values, and $n_{LP1}$ is the smoothing constant, the smoothing constant corresponding to a time constant of the dynamic low-pass filter.

6. The method according to claim 5, wherein $C_K$ is set to at least one.

7. The method according to claim 6, wherein $C_K$ is set to at least two.

8. A method for coating a metal strip with a coating metal using a coating plant, comprising the steps of:

passing the metal strip through an electrolyte in an electroplating cell, a current flowing through the electroplating cell, the current effecting a deposition of a layer of the coating metal on the metal strip;

controlling the current using a monitor controller so that the layer of the coating metal deposited on the metal strip is a predetermined thickness, the monitor controller including a process model and a controller part;

controlling the current as a function of a coating weight minimum value using a dynamic low-pass filters;

determining whether a state of the coating plant is altered, the state of the coating plant being altered when a new metal strip enters the coating plant or when the layer of the coating metal deposited on the metal strip is less than a predetermined minimum thickness; and adjusting a time constant of the controller part to the altered state when the state of the coating plant is determined altered.

9. The method according to claim 8, wherein the controlling step includes the step of:

controlling the current by the dynamic low-pass filter as a function of a ratio of the coating weight minimum value and a coating weight value ascertained by the process model.

10. The method according to claim 9, wherein the adjusting step includes the step of:

when the coating weight value falls below a lower limit setpoint value, reducing the time constant a small value, the time constant being associated with the dynamic low-pass filter.

11. The method according to claim 10, further comprising the step of:

setting the time constant to a large value to ensure adequate smoothing.

12. The method according to claim 10, further comprising the step of:

after the coating weight value is greater than the lower limit setpoint value, keeping output from the dynamic low-pass filter constant for a predetermined waiting time.

13. A method for coating a metal strip with a coating metal using a coating plant, comprising the steps of:

passing the metal strip through an electrolyte in an electroplating cell, a current flowing through the electroplating cell, the current effecting a deposition of a layer of the coating metal on the metal strip;

controlling the current using a monitor controller so that the layer of the coating metal deposited on the metal strip is a predetermined thickness, the monitor controller including a process model and a controller part;

adjusting a time constant of the controller part to the altered state when a state of the coating plant is altered; and determining a value of the current as a function of a coating weight setpoint, a strip width, a strip speed, a deposition equivalent value, and one of i) an efficiency of the electroplating cell, or ii) an efficiency of the controller output.

14. The method according to claim 13, wherein the step of determining the value of the current includes the step of:

determining the value of the current in accordance with the following relationship:

$$I_{total} = \frac{G^*_{mean} \cdot b_{strip} \cdot v_{strip} \cdot 60}{C_s \cdot \eta_{cells} \cdot k_{control}}$$

wherein $I_{total}$ is the value of the current, the value of the current corresponding to a total rectifier current, $G^*_{mean}$ is the coating weight setpoint;

$b_{strip}$ is the strip width, $v_{strip}$ is the strip speed, $C_s$ is the deposition equivalent value, $\eta_{cells}$ is the efficiency of the electroplating cell, and $k_{control}$ is the controller output, the controller output being an output from a current-control system.

15. A coating plant for coating a metal strip using a coating metal, comprising:

an electroplating cell through which current flows, the electroplating cell including an electrolyte through which the metal strip is passed, the current effecting a deposition of a layer of the coating metal on the metal strip; and a computing device controlling the current using a monitor controller, the monitor controller including a process model and a controller part, the computing device controlling the current in such a way that the layer deposited on the metal strip has a predetermined thickness, the computing device controlling the current as a function of a coating weight mean value using a dynamic low-pass filter, the computing device being adapted to adjust a time constant of the controller part if a state of the coating plant is altered, the time constant being adjusted to the altered state, wherein the state of the coating plant is altered when a new metal strip enters the coating plant or the layer deposited on the metal strip is less than a predetermined minimum thickness.

16. A coating plant for coating a metal strip using a coating metal, comprising:

an electroplating cell through which current flows, the electroplating cell including an electrolyte through which the metal strip is passed, the current effecting a deposition of a layer of the coating metal on the metal strip; and a computing device controlling the current using a monitor controller, the monitor controller including a process model and a controller part, the computing device controlling the current in such a way that the layer deposited on the metal strip has a predetermined thickness, the computing device controlling the current as a function of a coating weight minimum value using a dynamic low-pass filter, the computing device being adapted to adjust a time constant of the controller part if a state of the coating plant is altered, the time constant being adjusted to the altered state, wherein the state of the coating plant is altered when a new metal strip enters the coating plant or the layer deposited on the metal strip is less than a predetermined minimum thickness.

17. A coating plant for coating a metal strip using a coating metal, comprising:

an electroplating cell through which current flows, the electroplating cell including an electrolyte through which the metal strip is passed, the current effecting a deposition of a layer of the coating metal on the metal strip; and a computing device controlling the current using a monitor controller, the monitor controller including a process model and a controller part, the computing device controlling the current in such a way that the layer deposited on the metal strip has a predetermined thickness, the computing device being adapted to adjust a time constant of the controller part if a state of the coating plant is altered, the time constant being adjusted to the altered state, wherein the state of the coating plant is altered a new metal strip enters the coating plant or the layer deposited on the metal strip is less than a predetermined minimum thickness, occurs, and wherein the computing device is configured to determine a value of the current as a function of a coating weight setpoint, a strip width, a strip speed, a deposition equivalent value, and one of i) an efficiency of the electroplating cell, or ii) an efficiency of the controller output.

* * * * *